United States Patent [19]

Goldberger et al.

[11] Patent Number: 4,514,434
[45] Date of Patent: Apr. 30, 1985

[54] MEAT PATTY AND PROCESS FOR FORMING THE SAME

[75] Inventors: Robert D. Goldberger, Wayzata; James F. Stower, South St. Paul, both of Minn.

[73] Assignee: Goldberger Foods Inc., Minneapolis, Minn.

[21] Appl. No.: 487,285

[22] Filed: Apr. 21, 1983

[51] Int. Cl.³ .............................................. A22C 7/00
[52] U.S. Cl. ........................................ 426/646; 17/32; 426/513
[58] Field of Search ....................... 426/646, 513, 104; 17/32; 30/316, 305, 130

[56] References Cited

U.S. PATENT DOCUMENTS

| | | | |
|---|---|---|---|
| 3,863,020 | 1/1975 | Robinson | 426/646 |
| 3,940,217 | 2/1976 | McCarthy et al. | 17/32 |
| 4,106,162 | 8/1978 | Fournier | 426/513 |
| 4,418,446 | 12/1983 | Sandberg et al. | 426/513 |

Primary Examiner—George Yeung
Attorney, Agent, or Firm—James V. Harmon

[57] ABSTRACT

Meat patties of loose tender eating texture and natural irregular shape are produced by forming meat under pressure in a die cavity followed by pressing the top and bottom surfaces together to produce projections on the periphery and fracture lines near the edges while maintaining the weight of each patty precisely within predetermined limits.

13 Claims, 22 Drawing Figures

FIG. 19 grind meat product by passing meat product through grinder having grinder sieve plate with openings of a predetermined selected size chill or maintain temperature of meat product in chilled condition provide forming die having extended upper and lower surfaces and vertically disposed side walls with an uneven outline including a plurality of outwardly extending peripherally distributed recesses to receive ground meat force ground meat into die at pressure between about 70 and 80 psi within die to provide preform having substantially parallel upper and lower surfaces remove preform thus prepared from die and subject preformed patty to pressure by pressing upper and lower surfaces of patty toward one another to flatten preform in two successive stages said pressing stages cause patty to spread radially in all directions whereby a plurality of peripherally distributed oblate outwardly arched segments defining projections of irregular shape and distribution are formed around periphery of patty, said pressing also causes centrally projecting compression fracture lines to form between oblate projections maintain patty free from contact with molding, shaping or other smooth surfaced objects during and after successive pressing steps to thereby maintain the natural irregular contour of patty resulting from radial flow of particles resulting from pressing steps

FIG. 21

MEAT PATTY AND PROCESS FOR FORMING THE SAME

FIELD OF THE INVENTION

The invention relates to food products and more particularly to formed products and especially to formed meat products.

BACKGROUND OF THE INVENTION

In the automated production of frozen meat products, it has become the industry practice to manufacture the patties using high speed machinery in a centrally located production plant and to ship the patties in a frozen condition to the point of use; a restaurant or cafeteria or other food outlet such as a fast food restaurant. With the rapid growth of this industry, the use of meat patty forming machines has proliferated to the point where it has become almost essential to the successful operation of a high speed frozen meat plant in which frozen patties are produced. Some of the most modern of these machines operate at production speeds of 4,000 pounds or more per hour on a single line. After the patties are formed, they are conveyed directly into a freezing tunnel and frozen, for example, by surrounding them with liquid nitrogen. The frozen patties are then placed in cartons or boxes and are stored in the frozen condition for shipment to the restaurant. Typical equipment of this kind is illustrated by U.S. Pat. Nos. 4,182,003, 4,054,967 and 4,137,604.

While this equipment has been highly successful in producing meat patties at high speed, the results have not been entirely satisfactory particularly in better restaurants where high quality and slight nuances of flavor or texture become important. In these better quality restaurants, the conventional pressure formed patties are not perceived to have anything of value beyond those found in a fast food restaurant. Thus, equipment of the type described and illustrated in the patents produces patties having a flat, circular or square shape with almost perfectly smooth upper and lower surfaces. Many consumers believe these flat discs of meat are monotonous and unnatural and therefore are not especially appetizing. In addition, partly because they are relatively thin, usually about ¼" thick, but more importantly because they are circular or square in shape, all portions of the patty cook to about the same consistency. The result is that there are few variations in the eating taste and texture from one part of the finished patty to the other and the fat and moisture exuded during the cooking process which most people perceive as adding to the flavor of the finished meat can easily run off and be lost. Thus, the square or circular shaped meat patties with smooth upper and lower surfaces formed by the internal metal die surfaces of the machines are thought by many people to be rather insipid both in their eye appeal and in their taste and bite. Another problem with the die formed patties of the type described above is that they tend to have a relatively rubbery, almost resilient texture that many people find undesirable. Moreover, patties of this kind tend to become thinner as they cook and some of them shrink down to such an extent that the consumer is likely to wonder how a hamburger could be made so thin.

Attempts have been made for example as described in U.S. Pat. No. 3,060,494 for molding food into the form of a steak by forming the meat in a metal collar or ring similar to a cookie cutter with a separate shaped ring for the bone. This is, however, slow and each finished piece of meat produced has the same shape as all the others. By contrast with the present invention, it is an objective to find a way to give each piece a different and unique shape while operating at production speeds of around 2 tons an hour or more. Other equipment has been previously proposed as described in U.S. Pat. No. 3,550,190 for folding steaks along a center line but such steaks, depending upon their composition, can fall apart or delaminate at the contact line between the two layers. Moreover, the process forms a rather long piece of meat with pointed ends similar to a pastry turnover. This shape is unsatisfactory for many meat products particularly meat patties such as hamburger patties toward which the present invention is directed.

Achieving precise weight control of each patty is extremely important. In handmade patties there is, of course, no control. With machine made patties, control is possible provided subsequent operations do not change the piece weight, e.g., due to meat fragments falling off. Thus a 2% difference after a day of running at 4 tons per hour can make a difference of 1,280 lbs. of meat lost assuming the error is cumulative as an excess.

In overcoming the foregoing and related deficiencies of the prior art, this invention then comprises the features hereinafter fully described and particularly pointed out in the claims, the following description setting forth in detail certain illustrative embodiments of the invention, these being indicative, however, of but a few of the various ways in which the principles of the invention may be employed.

SUMMARY OF THE INVENTION

In accordance with the present invention, there is provided as a new article of manufacture a formed meat product that comprises a frozen patty of irregular shape with a varying outline and fractures distributed around its periphery. The patty is formed from compressed ground meat particles having a particle grind size of from about 3/32 to 5/32 of an inch. The patty has extended upper and lower surfaces that are substantially parallel with one another. The peripheral side edge of the patty is composed of a series of oblate outwardly arched segments defining projections of irregular shape and distribution. Centrally extending fracture lines are present between the oblate projections. At least some of these fracture lines or cracks extend from the upper to lower surfaces of the patty. If cooked in certain ways, it is possible for the projections and fracture lines between them to provide natural flavor variations and to help the patty fall apart easily when chewed. Thus some parts can be cooked if desired to a more well done condition while other parts are relatively rare thereby providing a more interesting and appetizing flavor more like a good cut of beef steak. It was also discovered that some of the fracture lines and interstices between the meat particles also tend to absorb and retain cooked out fat and moisture for flavor enhancement. This juice and fat would otherwise be lost and simply remain on the grill. The compression of the patty during manufacture provides sufficient cohesion between the particles so that it resists falling apart during the cooking operation in a frying pan or on a grill but the state of compression is controlled so that it does not reach too high a level. When cooked the patty still has a loose chewing texture with little resiliency so that it tends to fall apart easily when chewed. The patty is free from smooth molded surfaces produced by shaping or forming or molding dies or the like. This adds to its visual appeal, again tending to make it more appetizing and more natural looking.

While the present invention is particularly well suited for the production of beef patties or hamburgers, it can also be used for the production of other kinds of meat patties. The term "meat" as used herein is used in broad terms. It also refers to synthesized meat or what is commonly referred to as texturized vegetable protein and mixtures thereof with meat.

THE FIGURES

FIGS. 11 through 16 show the shape of a variety of die opening that can be used in accordance with the invention.

DESCRIPTION OF THE PREFERRED EMBODIMENT

Figure 1:
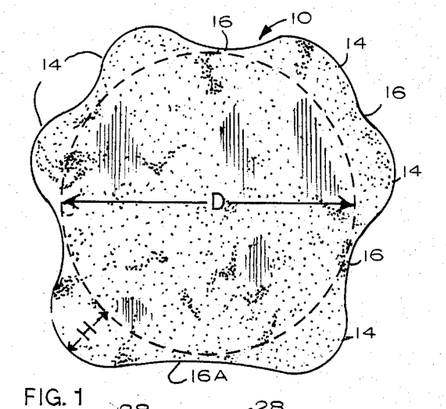
FIG. 1 is a preform of a meat patty prepared in accordance with the present invention in its first stage of manufacture.
Figure 6A:
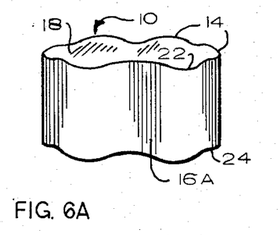
FIG. 6a is a perspective view of the preform of FIG. 1 on a reduced scale.
Figure 7:
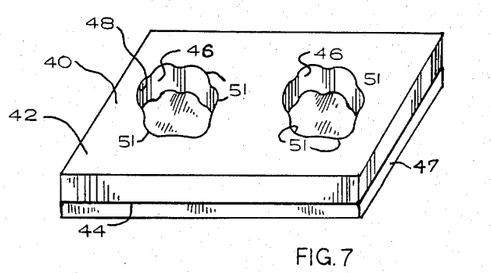
FIG. 7 is a perspective view of a molding plate with molding dies in accordance with the present invention.

Refer now to the figures and particularly to FIGS. 1, 6a and 7. In FIGS. 1 and 6a is shown a preform 10 in accordance with the present invention. The preform 10 has a vertical side wall 12 which is in a practical embodiment of the invention perfectly straight in a vertical direction at any point around the periphery of the preform. However, the outline of the preform as can be best seen in FIGS. 1 and 6a is irregular with a plurality of peripherally distributed outwardly extending oblate projections 14. These projections can be thought of blunt lobes. While the lobes 14 can be uniformly and symmetrically arranged around the periphery of the preform, they are preferably randomly arranged as shown in FIGS. 1 and 6. The lobes are separated by indentations 16 which may be of a very small size or the arc of a circle of great size as shown at 16a at the bottom of FIG. 1. The precise shape of the lobes 14 is not important but they preferably extend between about 1/10 to ⅓ of the diameter D of the preform assuming there were no projections present. Thus, in the case illustrated, the height H of the lobes 14 is about 1/6 the diameter D of the preform 10 without lobes.

The preform has perfectly smooth side wall 23, perfectly flat smooth top and bottom surfaces 18 and 21 respectively and the preform is also characterized by having a sharp edge at 22 and 24 between the intersection of the side wall 23 and the upper and lower surfaces 18 and 21 respectively.

Refer now to FIGS. 2 through 5 which illustrate the finished patty in accordance with the invention. As can be seen the patties 20 may be either somewhat elongated as in FIG. 2 or more or less circular. They are frozen and while anything under 32° F. is satisfactory, they are most preferably held at about 0° F. They are formed from compressed ground meat particles, usually beef, having a particle grind size of from about 3/32 of an inch to 5/32 of an inch and held together by compressing or packing the particles together. If the meat is ground too coarse, the resulting patty will not have sufficient cohesion and will not roll out properly. For example, it may break into several pieces. The same happens if the product is too cool when rolled.

As can be seen in FIGS. 2-5, the finished patty 20 has extended upper and lower surfaces 22 and 24 respectively which are substantially parallel to each other. The upper and lower surfaces are somewhat uneven rather than being flat and smooth as is the case in the preform 10. The finished patties have a peripheral edge 26 composed of a series of oblate outwardly extending segments which define projections 28 that are of irregular shape and distribution. While the outwardly curved surface of each projection varies in shape, it can be seen that many of them resemble segments of circles that are flattened on the poles, i.e., are oblate in shape.

Between many of the projections 28 are centrally projecting fracture lines 30 that extend from the upper to the lower surfaces of the patty. Both the projections 28 and the fracture lines or cracks 30 are distributed irregularly around the periphery of the patty giving it an appetizing appearance. Moreover, the projections 28, because they extend somewhat away from the center of the finished patty, tend to cook faster and to a higher temperature than the center. This allows one to grill the patty with delectable taste variations between the inside and outside so that portions develop a more fully roasted flavor while other parts can be made if desired to retain the flavor of rare meat. Thus, the projections separated by the fracture lines or cracks 30 make possible taste and texture variations. In addition, it has been noticed that the fracture lines 30 as well as other surface discontinuities and recesses tend to absorb and retain the juice that is exuded during the cooking process and help the patty to fall apart easily in the mouth when chewed. This includes both fat and moisture, both of which enhance the flavor of the finished cooked product. In a highly magnified view of a portion of the periphery of a patty 20 after cooking, some of the juice retained in the fractures 30 between the projections 28 is indicated at 32. Thus, the patties hang onto the cook-out juice better and are therefore more flavorful.

The compression used to pack the particles of the preform together should be sufficient to cause the particles to cohere to one another strongly enough so that they resist falling apart during the cooking operation on a pan, grill or other cooking surface. However, the particles are not compressed together with enough force so that the final product becomes tough and rubbery. Instead, compression is controlled. In this way, it was discovered that a product could be produced that has a loose bite texture with little resiliency so that it tends to fall apart easily when chewed.

The process for forming the patties will now be described in connection with FIGS. 5 through 10 and 21. As shown in FIG. 7, a die plate 40 is provided. The die plate 40 has parallel upper and lower surfaces 42 and 44 with die openings 46, each having the shape of the preform 10 already described. That is to say that each of the die openings 46 has a vertical peripheral wall 48 with a plurality of randomly distributed peripherally extending recesses 51. In the first stage of the process, the ground meat is packed into the die openings 46 to a predetermined state of compression. The vertical side wall 23 of the preform 10 is formed by the mating side wall surface 48 of the die opening 46. The upper and lower surfaces 18 and 20 of the preform are smooth flat surfaces that are formed by identical flat metal plates 47 only the lower one of which is shown in FIG. 7 defining flat, extended parallel upper and lower die surfaces which are pressed during manufacture against the upper and lower surfaces 42 and 44 of the die plate 40. The die plate 40 itself except for the die openings 46 can be the same as described in many of the issued patents mentioned previously. Various methods of filling the die openings 46 will be apparent to those skilled in the art in view of the aforementioned references once the principles of the invention are understood.

In the course of the development of the present invention, it was found important to control three factors to maintain the proper texture, i.e., chewing consistency and weight in the end product. First, meat should be chilled below room temperature. The best temperature for the meat particles entering the die is about 34° F.±2°. Because of the working or churning of the meat during the filling operation and also because the die plate 40 may become warm from movement during the forming operation, the meat when it is ejected from the die may have a slightly higher temperature. In the course of developing the present invention, a high incidence of rejects initially occurred. It was discovered that this could be overcome by making sure that the temperature of the meat in the die is within a few degrees above freezing but in any event is not less than 32° F. When this change was made, the problem of rejects was virtually eliminated primarily because the meat could then be formed to the proper shape. Thus, there is a certain amount of warming of the meat during the process of filling the die openings 46 and then later removing the compressed meat from the die.

With respect to the temperature variations, if the product is too cool, the preform 10 will have a tendency to split or fall apart completely when its height is reduced as described below. On the other hand, if it is too warm, the fractures 30 will not form to any noticeable extent and the product will be unsatisfactory.

The second factor that should be controlled is the coarseness of the grind. The particles are ground in a standard meat grinder of any suitable known construction having a perforated grinding plate with openings between about 3/32 and 4/32". This does not mean that all of the particles themselves will be between those dimensions but the size of the particles in any finished patty can be quickly determined by comparing them to particles that have been ground through such a plate. In other words, the size variations of the particles will have similar size distributions if ground through a plate with openings of from 3/32 to 5/32" across.

It was found that if ground much coarser, for example $\frac{1}{4}$", the particles will have a tendency to fall apart either during processing or cooking. On the other hand, if the particles are much smaller than those produced using a 3/32" grinding plate, they will have a tendency to produce a finished patty that is too dense in texture, rubbery or resilient, which is undesirable.

The third factor that should be controlled is the pressure applied in molding the preform 10 within the die opening 46. This product pressure is somewhat related to temperature in that more pressure can be used when the meat particles are at a lower temperature and correspondingly somewhat less pressure is needed when the product is at a little higher temperature such as 34° F. In any event, the applied pressure within the product should be between about 70 and 80 psi with 73–77 psi being the best. Molding can be accomplished, for example, by placing the die plate 40 on a flat surface, placing a quantity of ground meat in the die openings 46 and applying a flat compression plate (not shown) to the upper surface with sufficient force to provide a total pressure of about 75 psi in each of the die openings 46. This can be carried out by hand or as described above in automated equipment.

Once the preforms 10 have been made, they are removed from the dies by forcing them out through the open ends preferably in a downward direction onto any suitable support surface or conveyor (not shown). When formed on automated equipment, the preforms 10 are removed with knock-out cups (not shown) of suitable size and adapted to slide up and down through the die openings 46 after the meat preform has been molded therein.

Figure 5:
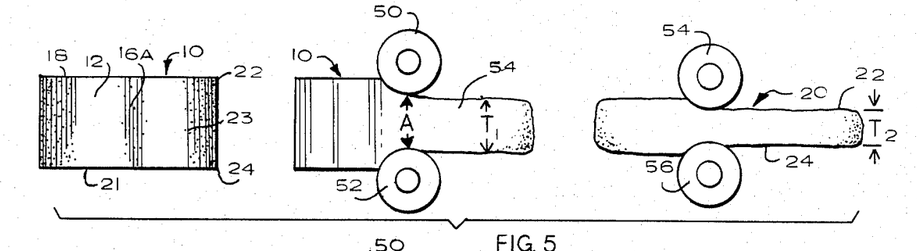
FIG. 5 is a diagrammatic side elevational view of several of the stages of production of patties in accordance with the invention.
Figure 8:
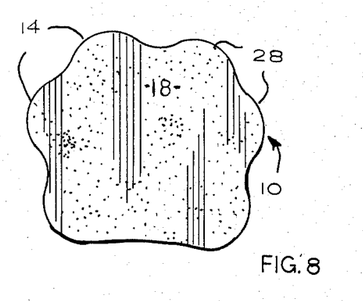
FIGS. 8, 9 and 10 show progressive stages of manufacture in accordance with the present invention.
Figure 9:
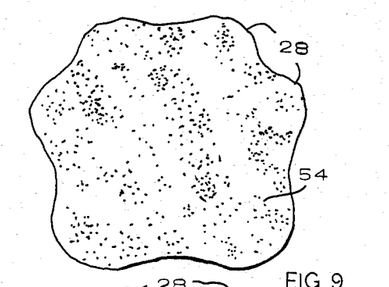

The next two stages of operation will be described in connection with FIG. 5. As seen in the figure, the preform 10 is advanced from left to right between a pair of vertically spaced apart parallel transversely extending driven compression rolls 50 and 52 that are set together at a distance A which is somewhat less than the height of the preform 10 for the purpose of pressing the upper and lower surfaces 18 and 21 toward one another to flatten the preform 10, i.e., reduce its thickness. For example, when the preform 10 has a height of an inch, the rolls 50, 52 are spaced about $\frac{5}{8}$" apart thereby producing an intermediate stage preform 54 which is partially reduced in height. The intermediate stage preform 54 can also be seen in FIG. 9. FIG. 8 illustrates the top of the preform 10 prior to passage between the rolls 50, 52. FIG. 9 illustrates the intermediate stage preform 54 after it is passed between rolls 50, 52 and its height reduced. It will be noticed that the projections 28 can be seen in the intermediate stage preform 54 and that the entire patty is considerably more spread out than the original preform 10. It is important to let the patty relax or rest for a short period of time after passing through the first set of compression rolls 50, 52. The time is not critical but allowing the preforms to rest for at least a second or two is usually enough. In a typical operation, the rest period may be from about 2–10 seconds. During this time, the meat may spring back slightly but undergoes a certain amount of relaxation during which time the stresses from the compression applied by the rolls 50, 52 are reduced. Next, the patty shown at 54 passes between a second pair of parallel spaced apart driven rolls 54 and 56, set closer together than rolls 50, 52 to produce a further flattening or rolling out of the patty so that its height $T_2$ (FIG. 5) is further reduced and to the final thickness desired for the finished patty. In a typical operation, the meat preform 10 is at the beginning an inch thick. The rolls 50, 52 are set to reduce the thickness in the first stage of pressure to a thickness $T_1$ of $\frac{5}{8}''$. In the second pressure stage, rolls 54, 56 reduce the patty to a thickness $T_2$ of 7/16″. It was found during the course of the development of the present invention that if an attempt were made to carry out the entire pressing procedure in a single step, the results were unsatisfactory because the meat would break apart or adhere to machine parts. However, by rolling out the patty preform 10 in two stages as shown in FIGS. 5 and 8–10, satisfactory results can be achieved. It is preferred that approximately equal height reductions be performed at each set of rolls. If desired, more than two pairs of compression rolls can be used but they have been found unnecessary.

Figure 10:
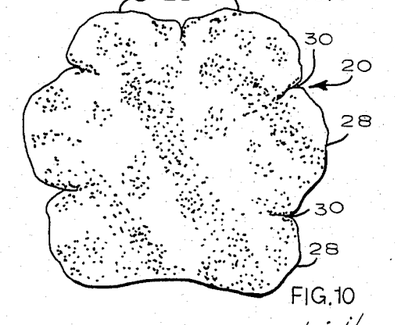
Figure 19:
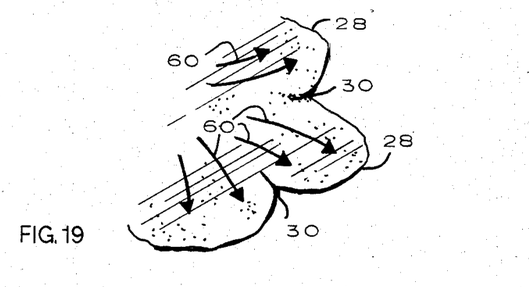
FIG. 19 is a view illustrating the flow of meat to form peripheral projections during the last stage of manufacture in accordance with the present invention.

Refer now to FIGS. 8–10 and 19. FIGS. 8–10 show the progressive steps of forming the finished patty 20. As can be seen, the top 18 of preform 10 is relatively smooth and flat and the projections 14 are evenly cured. However, after the first stage of compression in passing through rolls 50, 52, the intermediate stage preform 54 is considerably more spread out, the periphery having been expanded considerably. After the second stage of compression shown in FIG. 10, the preform has been expanded still further and pressure fractures 30 formed as the result of rolling are noticeable. The term "pressure fracture" as used herein means a crack or split with broken mating fracture surfaces produced by pressing the upper and lower surfaces of the patty toward one another. As shown in FIG. 19, during each stage of pressure the meat is forced to expand radially along flow lines 60 to form the finished projections 28. However, because the meat cannot flow as a true fluid, the pressure fracture lines 30 are formed due to the unrelieved stresses in the product.

Figure 18:
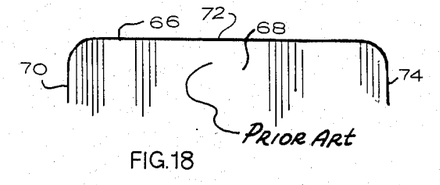
FIG. 18 is a view of one form of meat patty prepared in accordance with the prior art.

Refer now to FIG. 18 which illustrates one form of finished patty in accordance with the prior art. The patty, only one edge of which is shown in plan view in the figure, is designated as 66. It includes a flat smooth top surface 68 and flat smooth side and end edges 70, 72 and 74. By comparison of this patty with the invention FIGS. 2–4 and 10, it can be seen that FIGS. 2–4 and 10 are much more natural looking and are free from smooth molded surfaces produced by shaping, forming or molding dies or the like. This is particularly important where a large high-quality or gourmet meat patty is desired which often, because of its size, projects considerably out from the ends of the bun if one is used or is served on a plate with no bun as is often the case with a freshly grilled ground steak.

Figure 2:
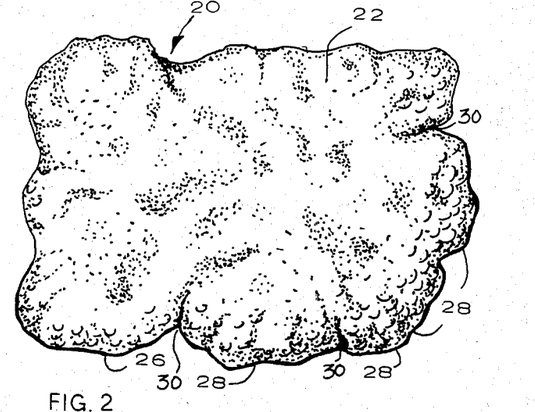
FIG. 2 is a finished meat patty as seen in plan view.
Figures 3, 4:
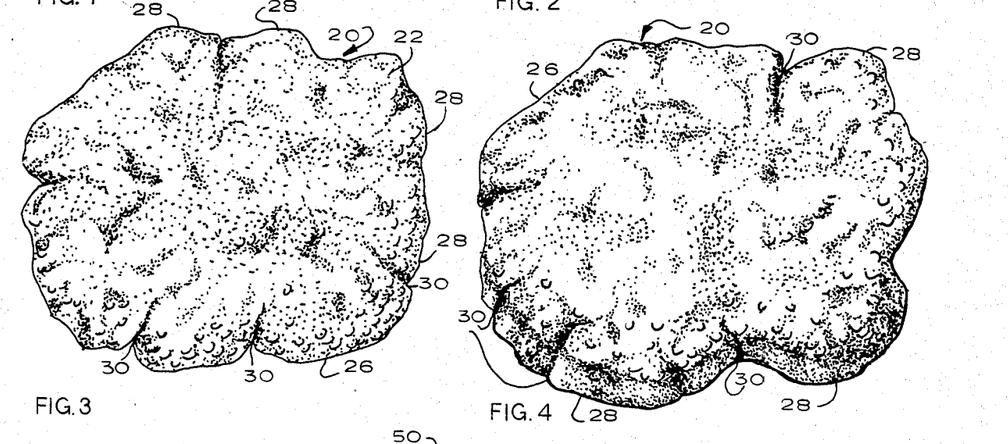
FIG. 3 is a plan view of another form of meat patty in accordance with the invention having a generally circular outline.
FIG. 4 is a perspective view of another meat patty prepared in accordance with the invention.
Figure 6B:
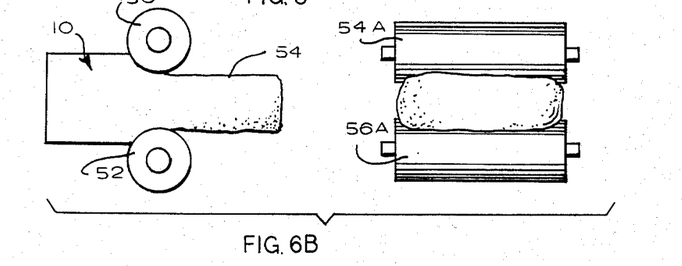
FIG. 6b is a semi-diagramatic representation of two stages of manufacture of the patties in accordance with a modified form of the invention.

Refer now to FIG. 6b. As seen in FIG. 6b, the preform 10 passes between the driven rolls 50, 52 in exactly the same manner already described in connection with FIG. 5. However, after passing through the first set of rolls, the patty at 54 is rolled at right angles to the direction that it was rolled in the first pass. This can be accomplished in several ways. In FIG. 6b this is illustrated diagrammatically by the patty 54 (after having passed through the first set of rolls 50, 52) being engaged by a second set of rolls 54a and 56a which press the patty in the same manner as rolls 54 and 56 but at right angles to the direction of rolls 50, 52. This will produce a finished patty 20 with a generally circular outline as shown in FIGS. 3 and 4. However, when the method of FIG. 5 is used, the patty will be somewhat elongated, for example as shown in FIG. 2 since the patty is rolled in the same direction in both passes. The form shown in FIG. 2 is especially desirable for serving with a hoagie bun or simply to resemble a piece of cut steak while the embodiments of FIGS. 3 and 4 are better for serving with circular buns. In the embodiment of FIG. 6b, it will thus be seen that the preform 10 passes between rolls 50, 52 from left to right in the figure and then undergoes a change of direction (the supporting conveyor not being shown for the sake of clarity) so as to move at right angles thereto, in this case away from the observer as shown at the right in the figure between the rolls 54a, 54b in a direction perpendicular to the plane of the paper.

Figure 11:
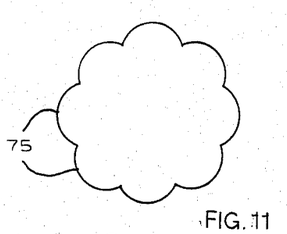
Figure 12:
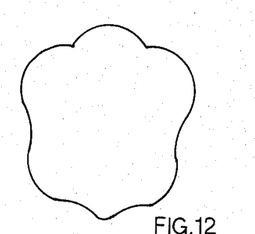
Figure 13:
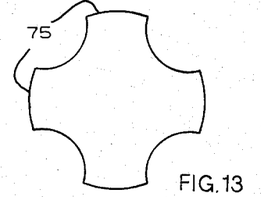
Figure 14:
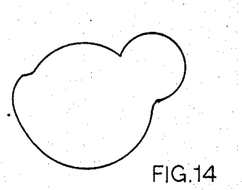
Figure 17:
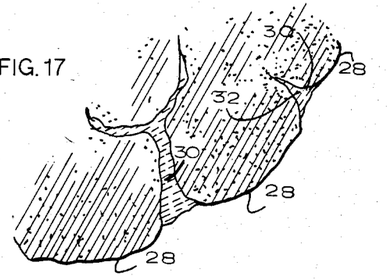
FIG. 17 is an enlarged or magnified view of a portion of a finished patty prepared in accordance with the invention.

Refer now to FIGS. 11–16 which illustrate various forms of die openings 46 that can be employed with the invention. While an infinite number is possible, FIGS. 11, 13, 15 illustrate symmetrical die openings, the one in FIG. 11 resembling the petals on a flower, 13 a maltese cross and 15 a circle with V-shaped centrally extending projections spaced evenly around the circumference. FIG. 12 is asymmetrical and resembles a shield while FIG. 14 resembles a bird and 16 a series of connected circles of different sizes. Some of these shapes will produce better results than others. The finished shape will depend on a number of factors such as the amount of compression during the rolling out of the preform, the temperature of the meat during the rolling process and its fluidity. Thus, it is found that even though symmetrical distribution of peripheral recesses 75 is used in the die opening that the rolling stages will produce some degree of asymmetry in the finished product particularly if rolling is carried out in the second rolling stage in the same plane but at right angles to the direction of rolling in the first stage as illustrated in FIG. 6b. Thus, the dies in FIGS. 11, 13, 15 will still produce a peripheral edge composed of a series of outwardly arched segments defining projections of irregular shape and distribution distributed around the patty.

Figure 20:
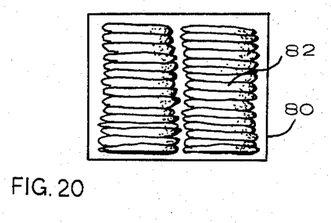
FIG. 20 is a carton of frozen patties in accordance with the present invention.
Figure 21:
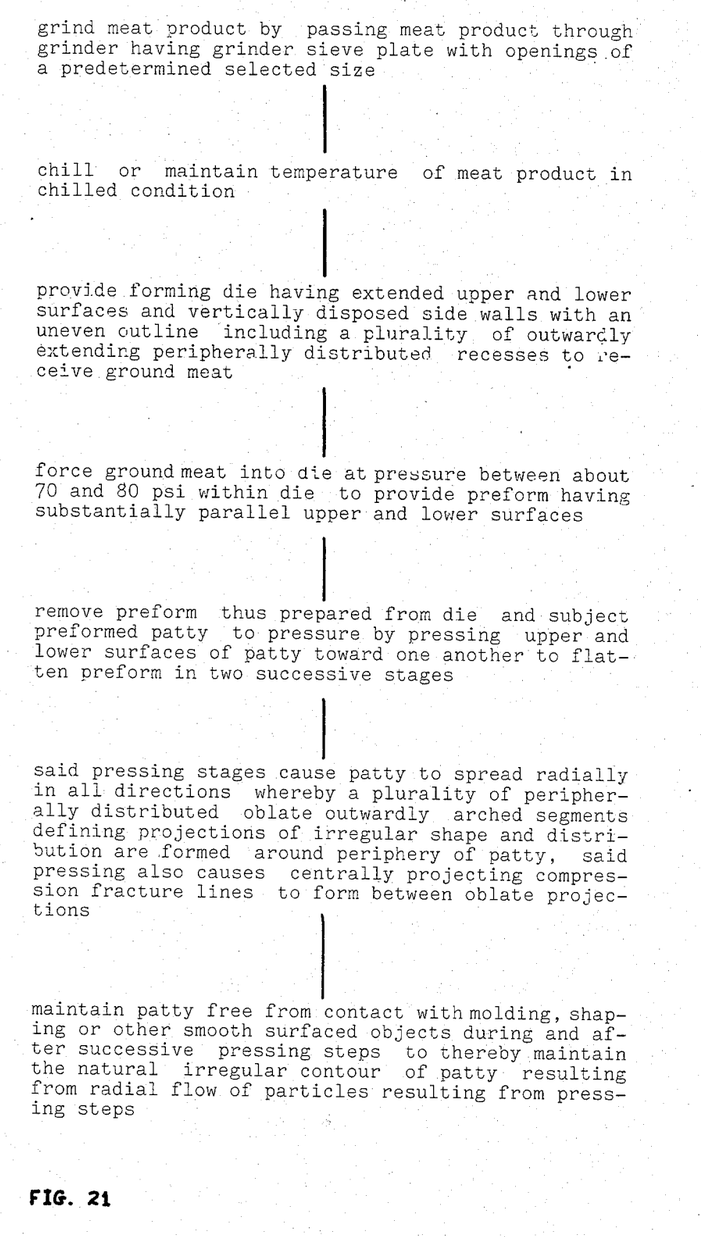
FIG. 21 is a flow chart of the process.

Refer now to FIG. 20 which illustrates a frozen package of patties in accordance with the invention. A frozen package typically contains 80 4-oz. patties and weighs about 20 pounds. It is frozen at a temperature of about 0° F. The container comprises a carton 80 into which the patties 82 are stacked with or without separating paper sheets. Separation sheets are preferred if the patties have a tendency to stick together. It is important to recognize that the patties in the carton 80 are all different shapes and each one is unique in its appearance. Moreover, they are all free from smooth molded surfaces but at the same time, each one is of a precisely predetermined weight. For example, in a typical run lasting for a period of three hours and 45 minutes with a target weight of 453.6 grams, the standard deviation was ±3.2 grams or ±0.7%.

The invention will be better understood by reference to the following examples.

EXAMPLE 1

A mixture of 75% lean cow meat, 25% corn fed beef is ground in a commercial hamburger grinder to a grind size resulting from the use of a 3/32″ screen. The fat content is approximately 25%. The ground meat is held to a temperature of 34° F. and is placed in die openings of the type shown in FIG. 7 using a die plate having a thickness of 1″, the die openings being approximately 3¼" across at their longest dimension. The ground meat is compressed to a pressure of 70 psi in the die opening and thereafter formed by pressing it in two stages as shown in FIG. 5 with a relaxation period of about five seconds between pressing stages. The first reduction in height is from 1" to ⅝" and the second height reduction is from ⅝" to 7/16" in thickness. The finished patties have random shapes and their weights vary less than ±1%. The product is then frozen and packaged for shipment.

EXAMPLE 2

Beef patties are prepared as in Example 1 except that the ground meat is prepared from 65% lean beef and 35% corn fed beef resulting in a fat content of about 28%. A grinding plate having 5/32" openings is used in the grinder resulting in somewhat coarser particles than in Example 1. The ground meat is held at a temperature of 32° F. when placed in the die opening and compressed to a pressure of 80 psi within the die opening. The product is rolled in two stages as shown in FIG. 6b with the second stage of rolling being accomplished in the same plane but at right angles to the direction of rolling in the first pass producing a finished patty having a relatively round outline as in FIGS. 3 and 4. The patty is then frozen in a freezing tunnel using liquid nitrogen.

EXAMPLE 3

Meat patties are prepared as in Example 1 except that the product is held at a temperature of about 33° F. at the time of molding after having been ground in a commercial grinder using a grind plate having openings of ⅛" diameter. The product is compressed in die openings to a product pressure of about 75±2 psi. The product is then removed from the die opening and passed successively between two sets of compression rolls set progressively closer together as shown in FIG. 5. The product is then frozen and packaged in cartons for shipment. All of the patties are of different shapes and the weights of the frozen patties were held to a tolerance of ±1%. The beef patties are made in size ranges from 2 oz. to 8 oz. or more and in each case the piece weight can be held to a tolerance of ±1%.

From this description, it can be seen that the present invention will provide patties of unique shapes and of any selected size or weight and of different diameters as required.

In addition, the eating texture or chewing consistency is much preferred over patties formed in the manner described in the aforementioned patents. The texture is much more tender or loose. In taste tests, it is generally judged to have a loose chewing texture with little resiliency so that it tends to fall apart easily when chewed. The cohesion, however, between the individual particles is sufficient to keep the hamburger in one piece during the cooking or frying operation. The improved texture is regarded to be much more appetizing than the kind of beef patty described in the references and accordingly it has much more consumer appeal. Some consumers even regard the texture as fluffy although it may be more precise to say that it simply falls apart in the mouth when chewed. In addition, while the prior machine-made beef patties tend to become thinner during cooking, the patties prepared in accordance with the invention actually become thicker or rounder; in other words, they tend to ball up more. This again improves its visual appeal and makes it more appetizing.

The patties also have good visual appeal because they are free from smooth molded surfaces. Besides being produced by molding dies, smooth contoured surfaces can be produced if the patty is able to strike objects or machine parts during or after the rolling process. Accordingly, it is important to keep the patties from touching smooth machine surfaces that could give them a sharp corner, indentation or the like since this would, in part, defeat the purpose of the rolling steps. To keep the upper and lower surfaces from being smooth, the rolls used for spreading out the preform may be provided with uneven surfaces or covered with rubber O rings or the like (not shown). Rings of this kind will provide an interesting surface texture to the upper and lower surfaces of the finished patty.

The chewing texture and eating characteristics of the patties are measured by evaluating the rebound following repeated compressions. This characteristic can be referred to as the repeated compression value or RC value, i.e., the thickness of the cooked patty following six repeated compressions divided by the original thickness. The test is carried out as follows: A group of patties that are to be tested are grilled for 5½ minutes from a frozen condition at 0° F. at which point they will be completely cooked. They are then laid on a test table and their height is measured using a test head with the face engaging the patty measuring 5 mm×75 mm. The height of each patty is first measured without changing the position of the test head. A weight of 2½ lbs. is then repeatedly applied to the test head forcing it downwardly into the patty six times. This simulates the sensation one would experience when the patty is chewed and is a good measure of its tender bite characteristics. The weight is then removed and the height of the test head is then recorded. Using this test, a group of patties prepared in accordance with the prior art were compared with the invention. The prior art patties were prepared using a standard patty forming machine with a die pressure (product pressure) of 100 lbs. in the die cavities. These patties were removed, frozen and subjected to the RC test described above. The results were as follows: The prior art patties had an average thickness of 26 mm. Following six compressions, with a weight of 2.5 lbs., the test head height averaged 20.3 mm, producing an RC value of 78%. With the invention, a group of patties having an average thickness of 26 mm had a final average thickness of 15.2 mm following six compressions with a 2.5 lb. weight. This results in an RC value of 58.3%. This work has shown that the RC value should be less than 70% and preferably less than 65% to provide a tender texture and loose chewing characteristics. Thus, when patties as described are compressed in a die cavity at between about 70 and 80 psi and then pressed to spread them radially, the result is that the patties will have sufficient cohesion between particles to cause them to resist falling apart when cooked in a frying pan or grill and will have an RC value of less than 70%. The patties also have a loose chewing texture with little resiliency so that bites tend to fall apart easily when chewed.

Many variations in the invention will be apparent to those skilled in the art within the scope of the appended claims once the principles disclosed are understood.

What is claimed is:
1. A meat product comprising,
   a chilled compressed patty of predetermined weight composed of ground meat particles having a particle grind size of from about 3/32 to about 5/32", the chilled patty being compressed to a state sufficient to provide enough cohesion between said particles to cause the patty to resist falling apart when cooked in a frying pan or on a grill and the compression of the patty being limited such that said patty when cooked has a loose chewing texture with little resiliency so that bites fall apart easily when chewed and said patty has a repeated compression value of less than 70% following cooking, the patty having extended upper and lower surfaces that are substantially parallel to each other and connected together by a peripheral side edge composed of a series of outwardly arched segments defining projections of varying shape and distribution, said peripheral edge being free from smooth molded surfaces as produced by shaping, forming or molding members said projections having natural flow contours of meat displaced outwardly from the center of the patty said projections causing the patty to fall apart more naturally and easily when chewed and making possible taste and texture variations during cooking due to the projections cooking at a different rate and reaching a different cooking temperature than central portions of the patty, said patty having centrally projecting fracture lines between the projections, at least some of said fracture lines extending from the upper to the lower surfaces of the patty and from the edge partially toward the center of the patty and the fracture lines and interstices between particles being adapted to absorb and retain cook-out juices for flavor enhancement.

2. The product of claim 1 wherein the ground meat comprises beef ground to a particle size of about ⅛" and said fracture lines are pressure fractures.

3. The product of claim 2 wherein said ground meat beef including a mixture of fat containing beef to has a predetermined fat content, the projections comprise a multiplicity of lobes distributed asymmetrically about the periphery of the patty and each one of the patties has lobes distributed differently, giving each patty a unique shape.

4. The product of claim 1 wherein said meat product comprises ground beef wherein the cohesion between the particles is established by controlling the density through compression applied at a pressure between about 70-80 psi and the projections comprise irregularly distributed lobes on the periphery of the patty, and a plurality of the patties are assembled in a frozen package wherein the patties in the package are all of substantially the same predetermined weight but each patty is shaped differently to thereby provide the attractive visual appeal of a custom-made beef patty while maintaining precise weight tolerances of less than ±2% by weight for each patty with respect to a target weight.

5. A method of manufacturing meat patties comprising providing a meat product, grinding the meat product by passing the meat product through a grinder having a grinder sieve plate with openings from about 3/32" to 5/32" in diameter, maintaining the temperature of the meat product in a chilled condition greater than about 32° F., providing a forming die having extended upper and lower surfaces and vertically disposed side walls of an uneven outline including a plurality of outwardly extending peripherally distributed recesses to receive the ground meat, forcing the ground meat into the die at a pressure between about 70 and 80 psi within the die to provide a preform having substantially parallel upper and lower surfaces, removing the preform thus prepared from the die and subjecting the preformed patty to pressure by pressing the upper and lower surfaces of the patty toward one another to flatten the preform in two successive stages, said pressing stages causing the patty to spread radially in all directions whereby a plurality of peripherally distributed outwardly arched segments defining projections of irregular shape and distribution are formed around the periphery of the patty, said pressing also causing centrally projecting compression fracture lines to form between the projections and maintaining the patty at its edge free from contact with molding or shaping members during and after the successive pressing stages to thereby maintain the natural irregular edge contour of the patty resulting from the radial flow of the particles resulting from the pressing stages.

6. The process of claim 5 wherein the ground meat comprises beef and the temperature is maintained at the time of molding within the die at about 32°-34° F.

7. The process of claim 6 wherein the food product is ground beef having a grind size resulting from passing the beef through a grinding plate with openings of about ⅛", the ground meat is chilled or maintained at 34° F. ±2° F., the ground meat is forced into the die opening at a pressure of about 73-77 psi, the patties are then rolled in two successive compression stages the first of which reduces the thickness of the preformed patty by a predetermined amount and the second stage of which further reduces the thickness thereof with a relaxation step between said two stages of compression.

8. The process of claim 5 wherein the second compression stage is carried out in the same plane but perpendicular to the direction the patty was rolled in the first stage of compression to thereby provide a finished patty in which the length and width are about equal.

9. The product prepared by the process of claim 5.

10. The product prepared according to the process of claim 7.

11. The product of claim 1 wherein a plurality of the patties are packaged in a container, the container and its contents are frozen, each of the patties contained in the package is of a different shape but each patty in the container has a precisely controlled predetermined weight accurate to within about ±1% of a target weight and the repeated compression value of the cooked patty is less than 65%.

12. The process of claim 5 wherein the repeated compression value of the finished cooked patty is less than 65%.

13. The meat product of claim 1 wherein the patty is a preform molded to a predetermined shape that is pressed to define said projections and fracture lines.

* * * * *

UNITED STATES PATENT AND TRADEMARK OFFICE
CERTIFICATE OF CORRECTION

PATENT NO. : 4,514,434
DATED : April 30, 1985
INVENTOR(S) : Goldberger et al.

It is certified that error appears in the above-identified patent and that said Letters Patent is hereby corrected as shown below:

Column 11, line 39, "beef including a mixture of fat containing beef to", should be deleted.

Signed and Sealed this

Twenty-sixth Day of November 1985

[SEAL]

Attest:

DONALD J. QUIGG

Attesting Officer

Commissioner of Patents and Trademarks